(12) United States Patent
Fukuchi (10) Patent No.: US 7,043,112 B2
(45) Date of Patent: May 9, 2006

(54) OPTICAL WAVELENGTH-MULTIPLEXING TECHNIQUE

(75) Inventor: Kiyoshi Fukuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 389 days.

(21) Appl. No.: 09/991,689

(22) Filed: Nov. 26, 2001

(65) Prior Publication Data

US 2002/0064340 A1 May 30, 2002

(30) Foreign Application Priority Data

Nov. 27, 2000 (JP) .......................... 2000-359559

(51) Int. Cl.
*G02B 6/293* (2006.01)

(52) U.S. Cl. ......................... 385/24; 359/127
(58) Field of Classification Search ................ 359/341; 385/24, 37, 88
See application file for complete search history.

(56) References Cited

U.S. PATENT DOCUMENTS 5,563,733 A * 10/1996 Mitsuda et al. .......... 359/337.1
5,673,133 A *  9/1997 Imaoka et al. ............... 398/202
6,459,528 B1 * 10/2002 Cao ........................ 359/341.2

FOREIGN PATENT DOCUMENTS

JP       4-66390      3/1992
JP    2000-196782     7/2000

OTHER PUBLICATIONS

Kani, J., et al., "Bi–directional transmission to suppress inter–wavelength–band nonlinear interactions in ultra–wide band WDM transmission systems", OECC Technical Digest (1998) pp. 412, 413.

Ito, T., et al., "3.2Tb/s–1,500 km WDM transmission experiment using 64 nm hybrid repeater amplifiers", PDI-3.

Kasamatsu, T., et al., "1.50 um–band gain–shifted thulium–doped fiber amplifier with 1.05– and 1.56–um dual–wavelength pumping", Optics Letters, vol. 24, No. 23, (Dec. 1, 1999) pp. 1684–1686.

Kani, J., et al. "Trinal–wavelength–band WDM transmission over dispersion–shifted fibre", Electronics Letters, vol. 35, No. 4 (Feb. 18, 1999) pp. 321–322.

Japanese oFfice Action dated Nov. 4, 2003 with English translation of pertinent portions.

* cited by examiner

*Primary Examiner*—Frank G. Font
*Assistant Examiner*—Eric Wong
(74) *Attorney, Agent, or Firm*—Whitham, Curtis & Christofferson, P.C.

(57) ABSTRACT

An optical wavelength-multiplexing system allowing long distance transmission with reducing effects of noise and fiber nonlinearities is disclosed. First wavelength-multiplexing light and second wavelength-multiplexing light within a wavelength bandwidth of 100 nm or more are propagated in opposite directions through the same optical fiber. The wavelength band of the first wavelength-multiplexing light is set to a shorter wavelength side as compared to that of the second wavelength-multiplexing light. In addition, excitation light having a wavelength shorter than the wavelength band of the first wavelength-multiplexing light is propagated through the optical fiber in the same direction as the second wavelength-multiplexing light. The excitation light is shorter in wavelength than the first wavelength-multiplexing light by an amount determined depending on Raman scattering characteristic of the optical fiber.

26 Claims, 6 Drawing Sheets

OPTICAL WAVELENGTH-MULTIPLEXING TECHNIQUE

BACKGROUND OF THE INVENTION

1. Field of the Invention

The present invention generally relates to techniques of multiplexing multiple light waves on an optical transmission medium and in particular to an optical wavelength-multiplexing transmission system allowing high-capacity bidirectional data transmission using a wavelength bandwidth of 100 nm or more per optical transmission medium.

2. Description of the Related Art

For optical high-capacity communication networks using optical transmission lines (typically, optical fibers), Wavelength-Division Multiplexing (WDM) is the current favorite multiplexing technology since multiple WDM channels from different end users can be multiplexed on the same optical fiber. Since an optical fiber has a wide usable bandwidth, it can be divided into a number of non-overlapping wavelength bands, each of which is assigned to a different WDM channel.

A long distance transmission of WDM lightwave signals through an optical fiber requires periodic amplification of the WDM lightwave signals. An optical in-line amplifier such as Erbium-doped fiber amplifier (EDFA) is preferably employed as a repeater amplifier since it can concurrently amplify all the WDM lightwave signals with simplified structure and reduced cost.

A WDM transmission experiment has been recently reported such that 160×20-Gbit/s WDM transmission is successfully made over 1,500 km using optical amplifier repeaters with an optical wavelength band of 64 nm on one-direction signal transmission using both 1.55-µm band and 1.58-µm band where EDFA can amplify lightwave signals (T. Ito et al., "3.2 Tb/s-1,500 km WDM transmission experiment using 64 nm hybrid repeater amplifiers", Optical Fiber Communication Conference, Postdeadline Papers, PD24).

A necessary condition to improve the capacity of WDM transmission is to widen its wavelength width. However, the amplification-capable wavelength range of a currently available EDFA is limited to 1530–1560 nm and 1570–1620 nm. On the other hand, a silica-base fiber has a usable wavelength range from 1450 nm with relatively low loss. Accordingly, an optical amplification technique providing an operable wavelength range from 1450 nm to 1530 nm becomes important.

There has been proposed an optical amplifier using a thulium-doped fiber that meets the above requirement (see, for example, Japanese Patent Application Unexamined Publication No. 4-66390). A signal light and a excitation light having a wavelength of 1.06 µm are combined to travel within the thulium-doped fiber functioning as a gain medium, resulting in amplification of the signal light at around 1470 nm.

Further, there has been reported a combination of the thulium-doped fiber amplifier and the EDFA in the same direction signal transmission allowing high-capacity transmission at three wavelength bands: 1464–1478 nm; 1535–1558 nm; and 1574–1599 nm (J. Kani at al., "Trinal-wavelength-band WDM transmission over dispersion-shifted fiber", Electronics Letters, Vol. 35, No. 4, pp. 321–322, 1999). A bidirectional signal transmission may be realized by using two optical fibers, each of which provides two or three wavelength bands according to the above-described techniques. Such techniques allow high-capacity transmission using a wavelength bandwidth of 100 nm or more.

Furthermore, there has been proposed a technique allowing the thulium-doped fiber amplifier to provide the amplification-capable wavelength range from 1480 nm to 1510 nm in which the optical fiber provides lower loss by modifying the pumping method of the thulium-doped fiber amplifier (T. kasamatsu et al., "1.50-µm-band gain-shifted thulium-doped fiber amplifier with 1.05- and 1.56-µm dual-wavelength pumping", Optics Letters, Vol. 24, No. 23, pp. 1684–1686, 1999). This technique will be used to construct a high-performance broadband transmission system allowing, for example, a longer transmission distance and so on.

In WDM transmission using a wavelength bandwidth of 100 nm or more as a transmission wavelength band, however, Raman scattering within a single fiber becomes significant. Raman scattering is a phenomenon that a scattering of light of a certain wavelength is caused by phonons to produce light of a different wavelength within the fiber. The Raman scattering causes energy to be transferred in part from light of a shorter wavelength to light of a longer wavelength. The amount of energy transferred from the shorter wavelength light to the longer wavelength light is in proportion to the intensity of the longer wavelength light. Accordingly, the higher the intensity of the longer wavelength light, the larger the amount of energy transferred from the shorter wavelength light to the longer wavelength light. In the case of silica-base fiber, it is well known that the amount of energy transferred from the shorter wavelength light to the longer wavelength light is maximized at around 1.5 µm when the difference between the longer wavelength and the shorter wavelength is 100 nm.

In recent WDM transmission using a wavelength bandwidth of 100 µm or more, as described above, Raman scattering causes a shorter wavelength light traveling over a single fiber to be attenuated excessively and, contrarily, the longer wavelength light traveling over the same fiber to be amplified. Hereafter, such a phenomenon is called "inter-band Raman scattering". When the inter-band Raman scattering occurs strongly, the shorter wavelength light dramatically reduces in power at an output end of the fiber or an input of a repeater, resulting in increased error rate at the output end, deteriorated signal-to-noise ratio, and the like.

It is known that distributed Raman amplification is effectively applied to compensate for excessive loss caused by the Raman scattering. The distributed Raman amplification is caused by Raman scattering effect to amplify light traveling in one direction within the fiber. Specifically, the shorter wavelength light traveling within the fiber in one direction is amplified by the presence of excitation (or pump) light traveling within the same fiber in the opposite direction, the excitation light having a wavelength further shorter than the shorter wavelength light by about 100 nm. In the above WDM transmission, since the maximum amount of energy transferred from the shorter wavelength light to the 100-nm longer wavelength light, by injecting further 100-nm shorter excitation light into the fiber at the output end thereof, the distributed Raman amplification can compensate for power loss of the shorter wavelength light to avoid reduction in signal light power at the output end.

However, in reality, only the distributed Raman amplification cannot sufficiently compensate for signal deterioration caused by attenuation of the shorter wavelength light due to the inner-band Raman scattering. As described before, the amount of energy transferred from the shorter wavelength light to the longer wavelength light is in proportion to the intensity of the longer wavelength light. Accordingly, the shorter wavelength light reduces in power more strongly at a position getting near the input end of the fiber into which the longer wavelength light is injected since the intensity of the longer wavelength light is high at that input end.

On the other hand, the distributed Raman amplification occurs more strongly getting near the output end of the fiber because the excitation light is injected into the output end. However, the shorter wavelength light has significantly reduced in power at the output end due to attenuation caused by the inter-band Raman scattering and attenuation caused by transmission loss while traveling over the fiber. Accordingly, when a very weak light is amplified by the distributed Raman amplification, Signal-to-noise ratio is significantly deteriorated by noise light generated during the amplification process, resulting in deteriorated transmission characteristics and therefore reduced quality of transmission.

In addition, since the longer wavelength light is amplified by the inter-band Raman scattering more strongly getting near the input end of the fiber, the average power of the longer wavelength light becomes high over the fiber. When the longer wavelength light increases in power, nonlinear optical effect within the fiber (for example, nonlinear optical effect due to third-order nonlinear component such as self-phase modulation) also increases, resulting in increased waveform distortion after traveling over the fiber.

SUMMARY OF THE INVENTION

An object of the present invention is to provide an optical wavelength-multiplexing system and method allowing long distance transmission with reducing effects of noise and fiber nonlinealities.

Another object of the present invention is to provide a wavelength-multiplexing repeater and wavelength-multiplexing transceiver for use in a wavelength-multiplexed transmission system allowing long distance transmission together with reducing effects of noise and fiber non-linearities.

According to the present invention, an optical wavelength-multiplexing transmission system for transmitting first wavelength-multiplexing light and second wavelength-multiplexing light in opposite directions through an optical transmission medium allowing bidirectional wavelength-multiplexing transmission, wherein a wavelength band of the first wavelength-multiplexing light is set to a shorter wavelength side as compared to a wavelength band of the second wavelength-multiplexing light, and excitation light having a wavelength shorter than the wavelength band of the first wavelength-multiplexing light travels through the optical transmission medium in a same direction as the second wavelength-multiplexing light.

A spacing between the wavelength of the excitation light and the wavelength band of the first wavelength-multiplexing light may be determined depending on Raman scattering characteristic of the optical transmission medium. A wavelength bandwidth including the first wavelength-multiplexing light and the second wavelength-multiplexing light may be at least 100 nm.

The optical wavelength-multiplexing transmission system may include: a first transceiver provided at one end of the optical transmission medium, for injecting the first wavelength-multiplexing light into the optical transmission medium and receiving the second wavelength-multiplexing light from the optical transmission medium; and a second transceiver provided at the other end of the optical transmission medium, for injecting the second wavelength-multiplexing light and the excitation light to the optical transmission medium and receiving the first wavelength-multiplexing light from the optical transmission medium.

The optical wavelength-multiplexing transmission system may further include: at least one wavelength-multiplexing repeater provided between the first transceiver and the second transceiver, comprising: a first amplifier for amplifying the first wavelength-multiplexing light; a second amplifier for amplifying the second wavelength-multiplexing light; and an excitation light injector for injecting second excitation light into the optical transmission medium in the same direction as the excitation light injected by the second transceiver, wherein the second excitation light has a wavelength which is approximately equal to the excitation light.

The optical wavelength-multiplexing transmission system may include: a first end device provided at one end of each of a first optical transmission medium and a second optical transmission medium, including: a first transceiver for injecting first wavelength-multiplexing light into the first optical transmission medium and receiving second wavelength-multiplexing light from the first optical transmission medium; and a second transceiver for injecting the second wavelength-multiplexing light and first excitation light into the second optical transmission medium and receiving the first wavelength-multiplexing light from the second optical transmission medium; and a second end device provided at the other end of each of the first optical transmission medium and the second optical transmission medium, including: a third transceiver for injecting the second wavelength-multiplexing light and second excitation light to the first optical transmission medium and receiving the first wavelength-multiplexing light from the first optical transmission medium; and a fourth transceiver for injecting the first wavelength-multiplexing light to the second optical transmission medium and receiving the second wavelength-multiplexing light from the second optical transmission medium.

The optical wavelength-multiplexing transmission system may further include a first wavelength-multiplexing repeater provided on a line of the first optical transmission medium, including: a first amplifier for amplifying the first wavelength-multiplexing light; a second amplifier for amplifying the second wavelength-multiplexing light; and a first excitation light injector for injecting third excitation light into the first optical transmission medium in the same direction as the second excitation light injected by the third transceiver, wherein the third excitation light has a wavelength which is approximately equal to the second excitation light; and a second wavelength-multiplexing repeater provided on a line of the second optical transmission medium, including: a third amplifier for amplifying the first wavelength-multiplexing light; a fourth amplifier for amplifying the second wavelength-multiplexing light; and a second excitation light injector for injecting fourth excitation light into the second optical transmission medium in the same direction as the first excitation light injected by the second transceiver, wherein the fourth excitation light has a wavelength which is approximately equal to the first excitation light.

Third wavelength-multiplexing light may travel through the optical transmission medium in a same direction as the second wavelength-multiplexing light, wherein a wavelength band of the third wavelength-multiplexing light is set to a longer wavelength side as compared to the wavelength band of the first wavelength-multiplexing light and a shorter wavelength side as compared to the wavelength band of the second wavelength-multiplexing light. In this case, second excitation light may travel through the optical transmission medium in the same direction as the first wavelength-multiplexing light, wherein a wavelength of the second excitation light is set to be shorter than the wavelength band of the second wavelength-multiplexing light by a same amount as a wavelength spacing between the excitation light and the first wavelength-multiplexing light.

The second transceiver may further inject third wavelength-multiplexing light to the optical transmission medium, wherein a wavelength band of the third wavelength-multiplexing light is set to a longer wavelength side as compared to the wavelength band of the first wavelength-multiplexing light and a shorter wavelength side as compared to the wavelength band of the second wavelength-multiplexing light, and the first transceiver receives the third wavelength-multiplexing light from the second transceiver through the optical transmission medium.

The first wavelength-multiplexing light may be included in a wavelength range from 1480 nm to 1520 nm, and the second wavelength-multiplexing light may be included in a wavelength range from 1580 nm to 1620 nm. The third wavelength-multiplexing light may be included in a wavelength range from 1530 nm to 1560 nm.

According to another aspect of the present invention, an optical wavelength-multiplexing transceiver includes: a receiver for receiving first wavelength-multiplexing light from an optical transmission medium; and a transmitter for infecting second wavelength-multiplexing light and excitation light to the optical transmission medium, wherein a wavelength band of the second wavelength-multiplexing light is set to a longer wavelength side as compared to a wavelength band of the first wavelength multiplexing light, and the excitation light has a wavelength shorter than the wavelength band of the first wavelength-multiplexing light. A spacing between the wavelength of the excitation light and the wavelength band of the first wavelength-multiplexing light may be determined depending on Raman scattering characteristic of the optical transmission medium. A wavelength bandwidth including the first wavelength-multiplexing light and the second wavelength-multiplexing light may be at least 100 nm.

According to still another aspect of the present invention, a wavelength-multiplexing repeater for use in a wavelength-multiplexing transmission system for transmitting first wavelength-multiplexing light and second wavelength-multiplexing light in opposite directions through an optical transmission medium allowing bidirectional wavelength-multiplexing transmission, includes: a first amplifier for amplifying the first wavelength-multiplexing light; a second amplifier for amplifying the second wavelength-multiplexing light; and an excitation light injector for injecting excitation light into the optical transmission medium in the same direction as the second wavelength-multiplexing light, wherein a wavelength band of the second wavelength-multiplexing light is set to a longer wavelength side as compared to a wavelength band of the first wavelength-multiplexing light, and the excitation light has a wavelength shorter than the wavelength band of the first wavelength-multiplexing light.

According to further another aspect of the present invention, an optical transmission method includes the steps of: propagating first light of a first wavelength band in one direction through an optical transmission medium; propagating second light of a second wavelength band in an opposite direction to the one direction through the optical transmission medium, wherein the first wavelength band is shorter than the second wavelength band; and propagating excitation light of a predetermined wavelength in the opposite direction through the optical transmission medium, wherein the predetermined wavelength of the excitation light is shorter than the first wavelength band.

DETAILED DESCRIPTION OF THE PREFERRED EMBODIMENTS

1. Principle and Comparison 1.1 Principle

Figures 1A, 1B:
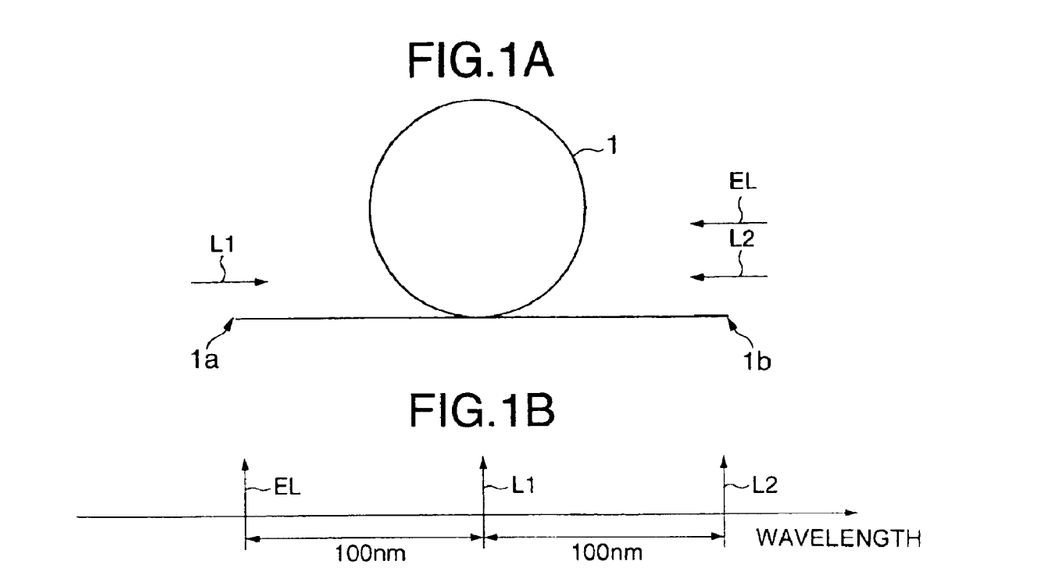
FIG. 1A is a diagram showing traveling directions of two signal lights and a excitation light in a WDM transmission system according to the present invention.
FIG. 1B is a diagram showing an arrangement of wavelengths of the two signal lights and the excitation light traveling over the WDM transmission line according to the present invention.

As shown in FIG. 1A, it is assumed that an optical fiber 1 is 80 km long, first light L1 is injected into the fiber 1 at one end 1a and then ejected from the fiber 1 at the other end 1b, and second light L2 and excitation light EL are injected into the fiber 1 at the other end 1b and then ejected from the fiber 1 at the end 1a. Here, it is assumed that the fiber 1 is made of silica-base material.

As shown in FIG. 1B, the wavelength of the first light L1 is shorter than that of the second light L2 by 100 nm so that the inter band Raman scattering affects the first light L1 most strongly. Similarly, the wavelength of the excitation light EL is shorter than that of the first light L1 by 100 nm so that the distributed Raman amplification can be adopted on the light L1 most effectively. Needless to say, the wavelength spacing between the first light L1 and second light L2, and the excitation light EL and the first light L1, is determined depending on the Raman scattering characteristic of the fiber 1.

As described before, when the first light L1 and second light L2 travel over the fiber 1, they are subjected to the inter-band Raman scattering, distributed Raman amplification, and attenuation due to the fiber 1.

Figure 1C:
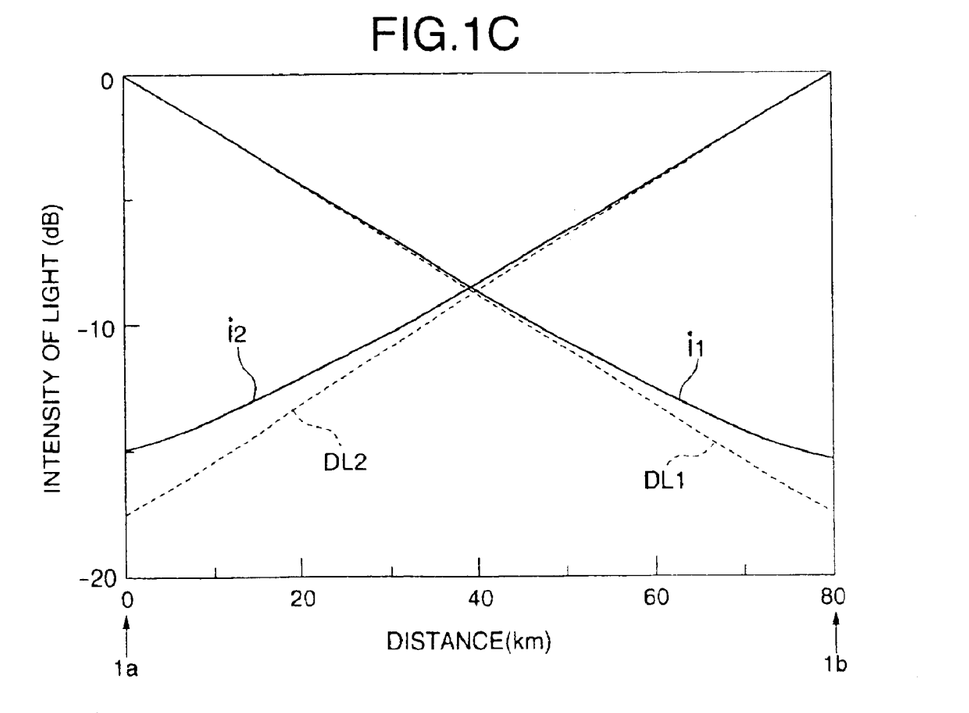
FIG. 1C is a graph showing light intensities of the two signal lights traveling over the WDM transmission line according to the present invention.

FIG. 1C is a graph showing a change in intensity of each light L1, L2 with respect traveling distance. In FIG. 1C, the vertical axis represents the intensity of light relative to the initial intensity at the injection end for each of the first light L1 and second light L2, where a curve i1 indicates a change in intensity of the light L1, and a curve i2 indicates a change in intensity of the light L2. Further, broken lines DL1 and DL2 indicate intensity changes of the respective lights L1 and L2 when neither inter-band Raman scattering nor distributed Raman amplification occurs but only fiber attenuation.

As shown in FIG. 1C, the light intensity i2 of the second light L2 is amplified by the inter-band Raman scattering more strongly as getting near the one end 1a of the fiber 1 since the intensity i1 of the first light L1 is higher near the one end 1a. Since the first light L1 and second light L2 travel within the fiber 1 in opposite directions, the second light L2 is amplified at locations near the one end 1a, or when the intensity i2 of the second light L2 has been sufficiently low. Accordingly, an increased intensity of the second light L2 causes little increase in average light intensity within the fiber 1, resulting in very small increase in nonlinear effect caused by the inter-band Raman amplification.

On the other hand, the intensity i1 of the first light L1 is subjected to significant attenuation near the other end 1b of the fiber 1 due to the inter-band Raman scattering. At the same time, near the other end 1b, the excitation light EL amplifies the first light L1 due to the distributed Raman amplification, compensating for the loss caused by the inter-band Raman scattering. This allows the intensity i1 of the first light L1 within the fiber 1 to be prevented from dramatically reducing, so that the light L1 reaches the other end 1b without reducing in its intensity within the fiber 1. Accordingly, the signal power is kept at high level with respect to noise caused by the distributed Raman amplification, making deterioration in signal-to-noise ratio very small.

1.2 Comparison

As described above, according to the present invention, the first light L1 and the second light L2 travel in opposite directions within the fiber 1 to allow bidirectional communication.

Figure 2A:
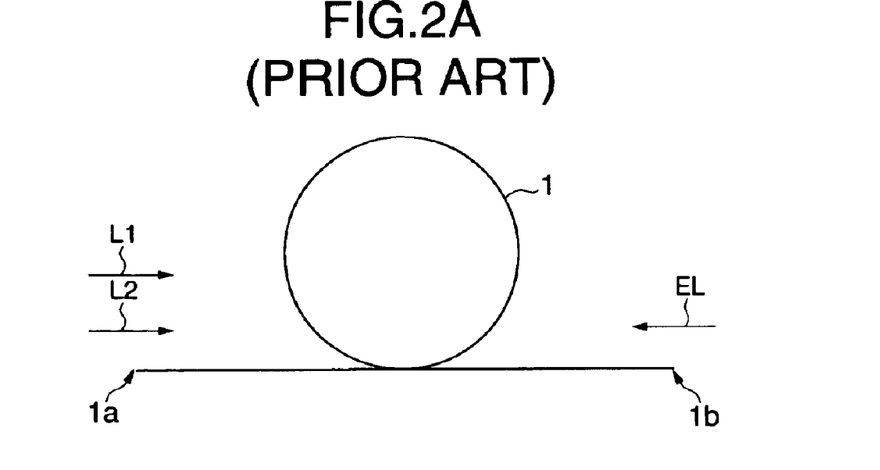
FIG. 2A is a diagram showing traveling directions of two signal lights and a excitation light in a conventional WDM transmission system.

In contrast, as shown in FIG. 2A, the first light L1 and the second light L2 are injected into the fiber 1 at the one end 1a and then ejected from the fiber 1 at the other end 1b. The excitation light EL is injected into the fiber 1 at the other end 1b and travels in the opposite direction to the first and second lights L1 and L2. By adding another fiber to the fiber 1, bidirectional communication can be performed. The wavelength arrangement is the same as shown in FIG. 1B.

Figure 2B:
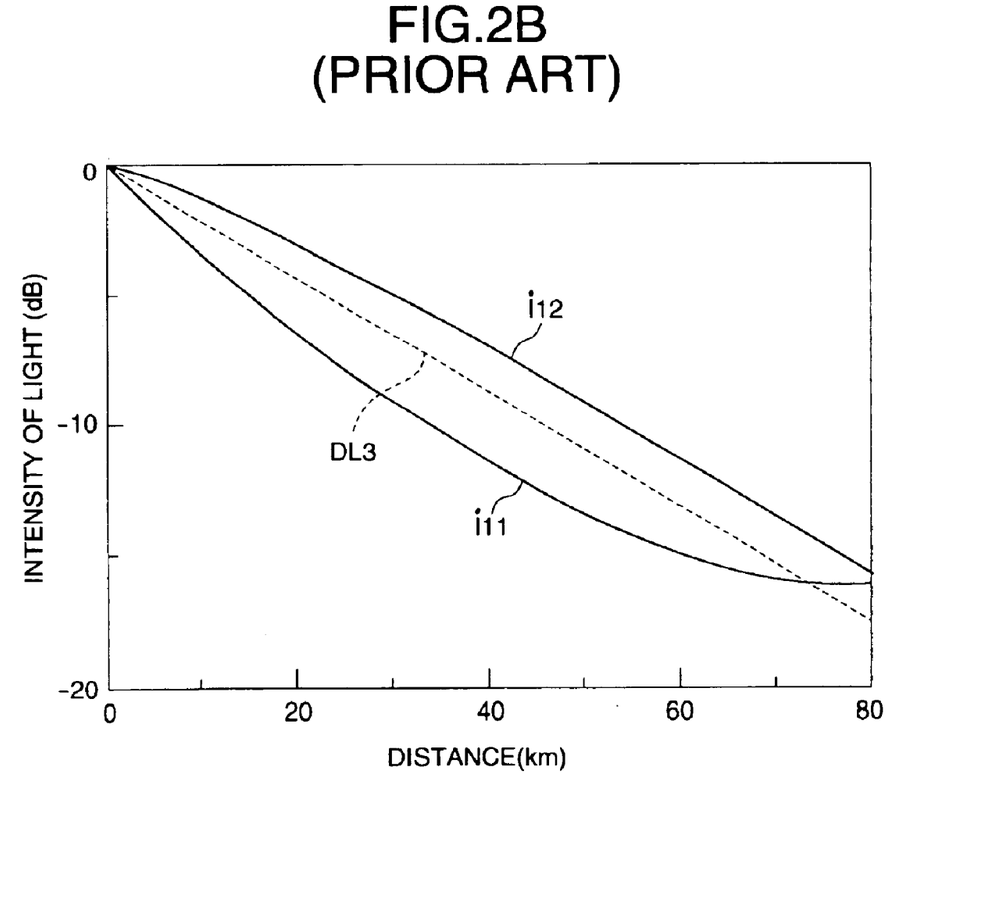
FIG. 2B is a graph showing light intensities of the two signal lights traveling over the conventional WDM transmission line.

FIG. 2B is a graph showing a change in intensity of each light L1, L2 with respect traveling distance. In FIG. 1C, a curve il1 indicates a change in intensity of the light L1, and a curve il2 indicates a change in intensity of the light L2. Further, broken line DL3 indicates an intensity change of the lights L1 and L2 when neither inter-band Raman scattering nor distributed Raman amplification occurs but only fiber attenuation.

As shown in FIG. 2B, the intensity il2 of the second light L2 is relatively high over the fiber 1 and the intensity il1 of the first light L1 is relatively low over the fiber 1 except in the vicinity of the other end 1b. Accordingly, the first light L1 is strongly subjected to noise caused by the distributed Raman amplification and the second light L2 is strongly subjected to the nonlinear effect.

In contrast, comparing FIG. 2B with FIG. 1C, it is apparent that, according to the present invention, deterioration caused by the nonlinear optical effect and the Raman amplification noise can be reduced within the fiber 1.

The present invention is not simply a combination of WDM bidirectional transmission technique and distributed Raman amplification technique but effective application of the distributed Raman amplification technique to the WDM bidirectional transmission technique. The bidirectional optical transmission technique such that two different wavelengths are assigned to different transmission directions is a known technique (see Japanese Patent Application Unexamined Publication No. 10-278314).

As of inter-band Raman scattering, the amount of attenuation of a shorter wavelength light in the same-direction WDM transmission as shown in FIG. 2A is equal to that in the opposite direction transmission as shown in FIG. 1A. Accordingly, there is no difference in transmission quality due to attenuation between the systems of FIG. 1A and FIG. 2A. When the distributed Raman amplification is applied to the systems of FIG. 1A and FIG. 2A, however, only the opposite-direction transmission as shown in FIG. 1A can avoid causing light level within the fiber to be reduced and therefore can prevent the signal-to-noise ratio from deteriorating.

Further, there has been disclosed a WDM transmission system such that bidirectional transmission using a plurality of wavelength bands allows reduced nonlinear effect (see J. Kani et al., "Bi-directional transmission to suppress inter-wavelength-band nonlinear interactions in ultra-wide band WDM transmission systems", Third Optoelectronics and Communication Conference Technical Digest, 16A1-5, pp. 412–413, 1998). According to this system, a 1533–1545 nm WDM signal and a 1580–1595 nm WDM signal travel in opposite directions within a dispersion shifted fiber, reducing generated four wave mixing caused by the nonlinear effect within the fiber. However, recently, a dispersion management transmission line rather than the dispersion shifted fiber has been widely used and therefore the generated four wave mixing can be sufficiently reduced. Accordingly, it is considered that deterioration due to Raman scattering cannot be sufficiently prevented without using distributed Raman amplification.

As described above, the present invention provides a new structure that is not taught by the above prior art and has advantages over the prior art as described hereafter.

2. Preferred Embodiments

First Embodiment 2.1.1 System Configuration

Figure 3:
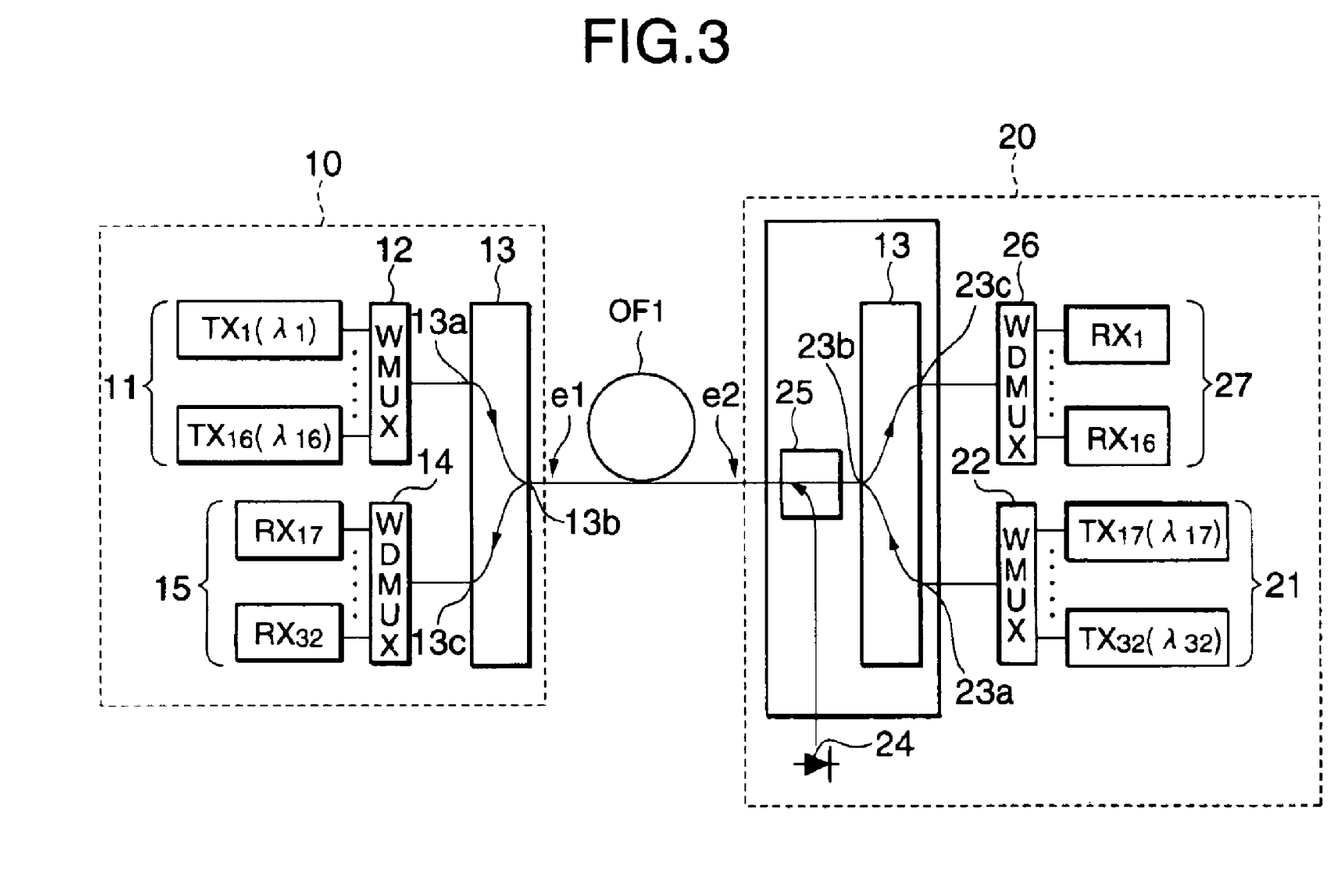
FIG. 3 is a diagram showing a WDM transceiver in a WDM transmission system according to a first embodiment of the present invention.

Referring to FIG. 3, an optical WDM transmission system according to a first embodiment of the present invention is composed of a WDM transceiver 10 and a WDM transceiver 20, which are connected by an optical fiber OF1 made of silica-base material.

The WDM transceiver 10 includes a WDM transmitter section 11 composed of sixteen 10 Gb/s optical transmitters $TX_1$–$TX_{16}$, AWG (Arrayed Waveguide Grating) wavelength multiplexer 12, a wavelength band coupler 13, AWG wavelength demultiplexer 14, and a WDM receiver section 15 composed of sixteen WDM optical receivers $RX_{17}$–$RX_{32}$.

The respective optical transmitters $TX_1$–$TX_{16}$ are set to different wavelength bands $\lambda_1$–$\lambda_{16}$ which are spaced every 100 GHz within a range from 1487.8 nm (201.5 tHz) to 1499.0 nm (200.0 THz), which is also called "1.49 μm band". The AWG wavelength multiplexer 12 multiplexes lights transmitted by the respective optical transmitters $TX_1$–$TX_{16}$ into first WDM light (hereafter, indicated by L1), which is output at an output port thereof. The output port of the AWG wavelength multiplexer 12 is connected to a port 13a of the wavelength band coupler 13.

The wavelength band coupler 13 inputs the first WDM light L1 of 1485–1505 nm at the port 13a and forwards it to a port 13b thereof, which is connected to one end e1 of the optical fiber OF1. Contrarily, second WDM light (hereafter, indicated by L2) of 1585–1605 nm inputted at the port 13b is forwarded to another port 13c. The port 13b is connected to the optical fiber OF1 and the port 13c is connected to an input port of the AWG wavelength demultiplexer 14.

The AWG wavelength demultiplexer 14 inputs the second WDM light L2 from the port 13c of the wavelength band coupler 13 and demultiplexes it into sixteen optical received signals of corresponding wavelengths, which are output to the respective WDM optical receivers $RX_{17}$–$RX_{37}$.

The WDM transceiver 20 includes a WDM transmitter section 21 composed of sixteen 10 Gb/s optical transmitters $TX_{17}$–$TX_{32}$, AWG wavelength multiplexer 22, a wavelength band coupler 23, a semiconductor laser 24, a coupler 25, AWG wavelength demultiplexer 26, and a WDM receiver section 27 composed of sixteen WDM optical receivers $RX_1$–$RX_{16}$.

The optical transmitters $TX_{17}$–$TX_{32}$ are set to different wavelength bands $\lambda_{17}$–$\lambda_{32}$ which are spaced every 100 GHz within a range from 1586.2 nm (189.0 tHz) to 1598.9 nm (187.5 THz), which is also called "1.58 µm band". The AWG wavelength multiplexer 22 multiplexes optical signals transmitted by the respective optical transmitters $TX_{17}$–$TX_{32}$ into the second WDM light L2, which is output at an output port thereof. The output port of the AWG wavelength multiplexer 22 is connected to a port 23a of the wavelength band coupler 23. The wavelength band of the second WDM light L2 is set to a longer wavelength side as compared to that of the first WDM light L1.

The wavelength band coupler 23 inputs the second WDM light L2 of 1585–1605 nm at the port 23a and forwards it to a port 23b thereof. Contrarily, the first WDM light L1 of 1485–1505 nm inputted at the port 23b is forwarded to another port 23c. The port 23b of the wavelength band coupler 23 is connected to the optical fiber OF1 through the coupler 25 and the port 23c is connected to an input port of the AWG wavelength demultiplexer 26.

The semiconductor laser 24 is a high-power Fabry-Perot semiconductor laser which emits output light having a wavelength of about 1400 nm as excitation light EL. In this embodiment, the light intensity ratio of the first WDM light L1, the second WDM light L2 and the excitation light EL is set to 1:1:2. A wavelength bandwidth of the excitation light EL emitted from the semiconductor laser 24 is preferably wide to some extent, for example, to the extent of several nm to ten-odd nm. A narrower wavelength bandwidth of the excitation light EL, for example, several tens pm to several hundreds pm, can produce the similar effect to suppress the deterioration of the first and second WDM lights due to nonlinear optical effect and Raman amplification noise as described before.

The coupler 25 combines the excitation light EL received from the semiconductor laser 24 with the second WDM light L2 received from the port 23b of the wavelength band coupler 23 to inject the combined light into the other end e2 of the optical fiber OF1.

The AWG wavelength demultiplexer 26 inputs the first WDM light L1 from the port 23c of the wavelength band coupler 23 and demultiplexes it into sixteen optical signals of corresponding wavelengths, which are output to the respective WDM optical receivers $RX_1$–$RX_{16}$.

2.1.2 Operation

The first WDM light L1 having a wavelength bandwidth of 1487.8–1499.0 nm is output from the AWG wavelength multiplexer 12 to the wavelength band coupler 13 and then is injected into the optical fiber OF1. The first WDM light L1 travels over the optical fiber OF1.

The first WDM light L1 is subjected to attenuation of the optical fiber OF1 and reduction in light intensity due to the inter-band Raman scattering by which energy of the first WDM light is transferred in part to the second WDM light L2. At the same time, since the intensity of the excitation light EL is high near the end e2 of the optical fiber OF1, the excitation light EL amplifies the first WDM light L1 due to the distributed Raman amplification. Accordingly, the first WDM light L1 travels to the other end e2 of the optical fiber OF1 without significantly reducing in its intensity.

When the WDM transceiver 20 receives the first WDM light L1 from the WDM transceiver 10, the first WDM light L1 enters the AWG wavelength demultiplexer 26 through the coupler 25 and the wavelength band coupler 23. The AWG wavelength demultiplexer 26 demultiplexes the first WDM light L1 into sixteen optical signals of corresponding wavelengths, which are output to the respective WDM optical receivers $RX_1$–$RX_{16}$.

In this way, the first WDM light L1 is transmitted from the WDM transceiver 10 to the WDM transceiver 20.

On the other hand, the second WDM light L2 having a wavelength bandwidth of 1586.2–1598.9 nm is output from the AWG wavelength multiplexer 22 to the wavelength hand coupler 23 and then is combined with the excitation light EL by the coupler 25. The combined light of the second WDM light L2 and the excitation light EL is injected into the optical fiber OF1.

As described before, the first WDM light L1 which is weak near the other end e2 is amplified due to the distributed Raman amplification, resulting in little influence of amplification due to the inter-band Raman scattering near the other end e2 of the optical fiber OF1. Significant influence of amplification due to the inter-band Raman scattering appears near the one end e1 of the optical fiber OF1 because the intensity of the first WDM light L1 is high near the one end e1. Therefore, even if the second WDM light L2 is amplified by the inter-band Raman scattering near the one end e1, an increased intensity of the second WDM light L2 causes little increase in average light intensity within the optical fiber OF1, resulting in very small increase in nonlinear effect caused by the inter-band Raman amplification.

When the WDM transceiver 10 receives the second WDM light L2 from the WDM transceiver 20, the second WDM light L2 enters the AWG wavelength demultiplexer 14 through the wavelength band coupler 13. The AWG wavelength demultiplexer 14 demultiplexes the second WDM light L2 into sixteen optical signals of corresponding wavelengths, which are output to the respective WDM optical receivers $RX_1$–$RX_{16}$. In this way, the second WDM light L2 is transmitted from the WDM transceiver 20 to the WDM transceiver 10.

Second Embodiment

Figure 4:
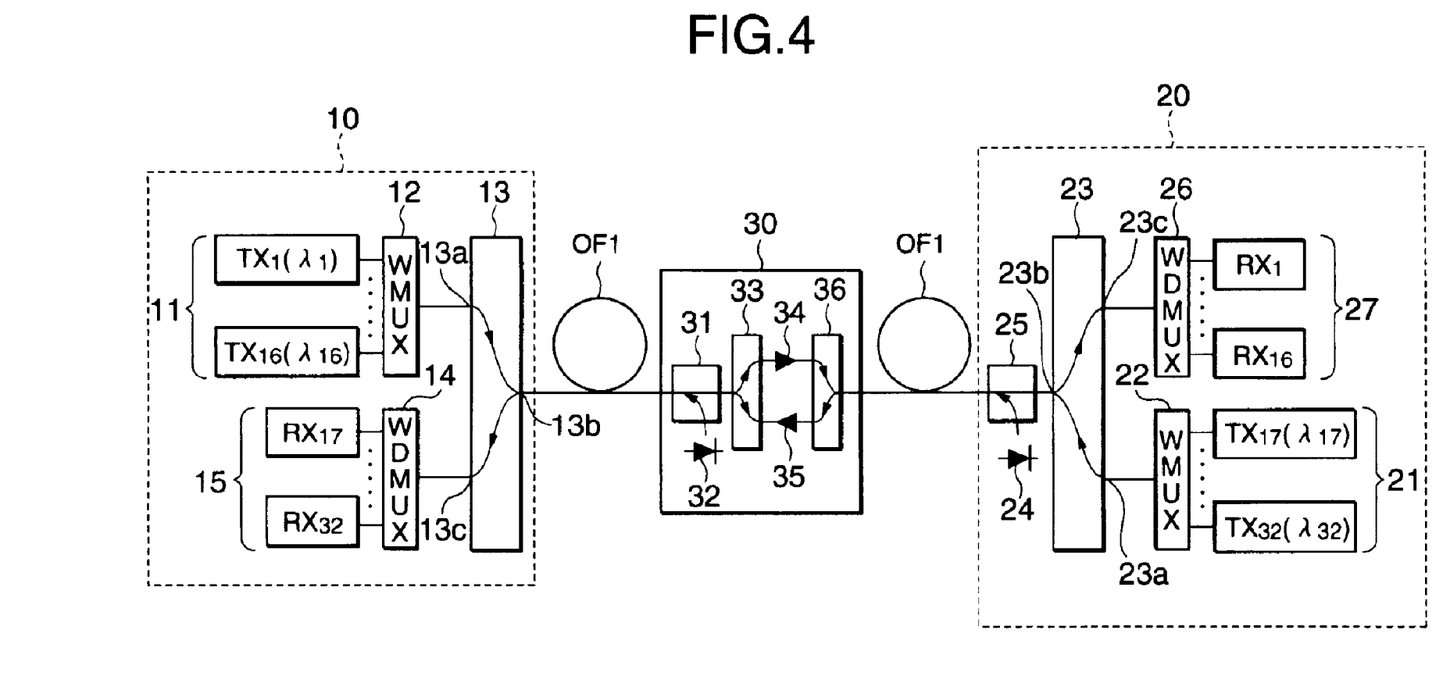
FIG. 4 is a diagram showing a WDM transceiver and a WDM repeater in a WDM transmission system according to a second embodiment of the present invention.

Referring to FIG. 4 an optical WDM transmission system according to a second embodiment of the present invention is composed of a WDM transceiver 10, a WDM transceiver 20, and a WDM repeater 30, which are connected by an optical fiber OF1 made of silica-base material. In FIG. 4, blocks similar to those previously described with reference to FIG. 3 are denoted by the same reference numerals and the details will be omitted.

The WDM repeater 30 is provided in the optical fiber OF1 to amplify the first WDM light L1 and the second WDM light L2 traveling in opposite directions within the optical fiber OF1, allowing long distance transmission. In this embodiment, the WDM repeater 30 is necessarily designed taking it into consideration that the first WDM light L1 and the second WDM light L2 which are different in wavelength band travel in opposite directions and the excitation light EL is combined with the second WDM light L2.

The WDM repeater 30 includes a coupler 31, a semiconductor laser 32, a wavelength band coupler 33, a Thulium-doped fiber amplifier 34, an Erbium-doped fiber amplifier 35, and a wavelength band coupler 36.

The first WDM light L1 received from the WDM transceiver 10 enters the wavelength band coupler 33 through the coupler 31 and is forwarded to the Thulium-doped fiber amplifier 34. The thulium-doped fiber amplifier 34 amplifies light of the 1.49 µm band. Accordingly, the first WDM light L1 is amplified by the thulium-doped fiber amplifier 34. Thereafter the amplified first WDM light L1 is transmitted to the WDM transceiver 20 through the wavelength band coupler 36 and the optical fiber OF1.

On the other hand, the second WDM light L2 received from the WDM transceiver 20 enters the Erbium-doped fiber amplifier 35 though the wavelength band coupler 36. The Erbium-doped fiber amplifier 35 amplifies light of the 1.58 µm band. Accordingly, the second WDM light L2 is amplified by the Erbium-doped fiber amplifier 35. Thereafter the amplified second WDM light L2 is forwarded to the coupler 31 by the wavelength band coupler 33. The coupler 31 combines the amplified second WDM light L2 with excitation light EL2 emitted from the semiconductor laser 32. The excitation light EL2 has the approximately same wavelength as the excitation light emitted by the semiconductor laser 24 of the WDM transceiver 20. A combined light of the second WDM light L2 and the excitation light EL2 is transmitted to the WDM transceiver 10 through the optical fiber OF1. In this manner, the repeater 30 amplifies the first WDM light L1 and the second WDM light L2 and, at the same time, compensates for attenuation of the excitation light EL from the WDM transceiver 20 by combining the excitation light EL2 to the second WDM light L2. This allows long distance transmission with suppressing nonlinear effect due to interband Raman scattering.

Third Embodiment

Figure 5:
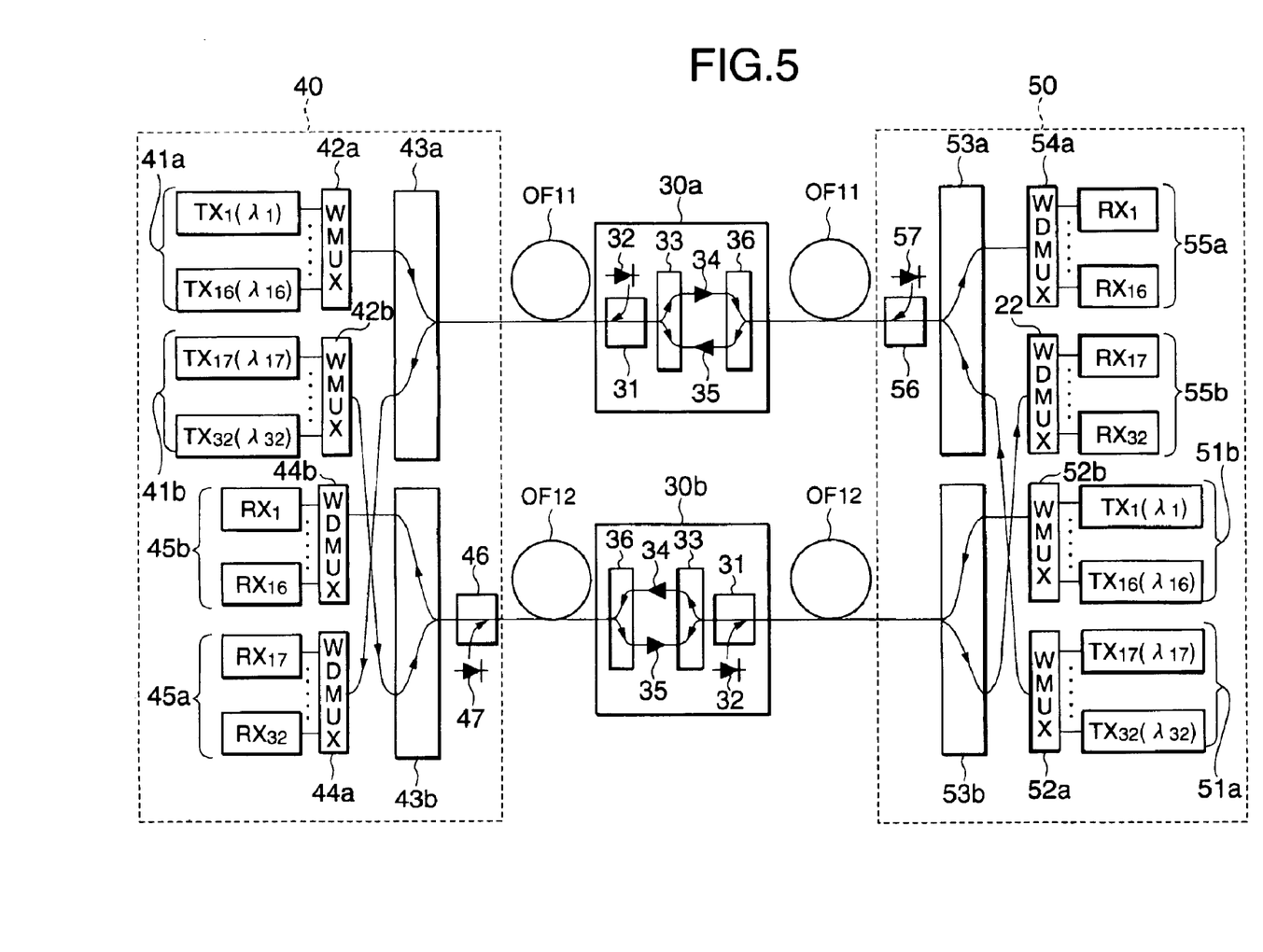
FIG. 5 is a diagram showing a WDM transceiver and a WDM repeater in a WDM transmission system according to a third embodiment of the present invention.

Referring to FIG. 5, an optical WDM transmission system according to a third embodiment of the present invention is composed of a WDM transceiver 40 and a WDM transceiver 50, which are connected by two optical fibers OF11 and OF12 in which WDM repeaters 30a and 30b are provided, respectively. Accordingly, the number of WDM channels can be increased.

Within the optical fiber OF11, the first WDM light L1 travels in one direction from the WDM transceiver 40 to the WDM transceiver 50 and the second WDM light L2 travels in the opposite direction from the WDM transceiver 50 to the WDM transceiver 40. Within the optical fiber OF12, the first WDM light L1 travels in one direction from the WDM transceiver 50 to the WDM transceiver 40 and the second WDM light L2 travels in the opposite direction from the WDM transceiver 40 to the WDM transceiver 50. In other words, the first WDM light L1 travels in opposite directions between the optical fibers OF11 and OF12 and the second WDM light L1 also travels in opposite directions between the optical fibers OF11 and OF12.

The WDM transceiver 40 includes a WDM transmitter section 41a composed of sixteen 10 Gb/s optical transmitters $TX_1$–$TX_{16}$, AWG wavelength multiplexer 42a, a wavelength band coupler 43a, AWG wavelength demultiplexer 44a, and a WDM receiver section 45a composed of sixteen WDM optical receivers $RX_{17}$–$RX_{38}$, which are the same as the WDM transmitter section 11, the AWG wavelength multiplexer 12, the wavelength band coupler 13, the AWG wavelength demultiplexer 14, and the WDM receiver section 15 as shown in FIG. 3, respectively.

The WDM transceiver 40 further includes a WDM transmitter section 41b composed of sixteen 10 Gb/s optical transmitters $TX_{17}$–$TX_{32}$, AWG wavelength multiplexer 42b, a wavelength band coupler 43b, AWG wavelength demultiplexer 44b, and a WDM receiver section 45b composed of sixteen WDM optical receivers $RX_1$–$RX_{16}$, which are the same as the WDM transmitter section 21, the AWG wavelength multiplexer 22, the wavelength band coupler 23, the AWG wavelength demultiplexer 26, and the WDM receiver section 27 as shown in FIG. 3, respectively.

In addition, the WDM transceiver 40 includes a coupler 46 and a semiconductor laser 47, which are the same as the coupler 25 and the semiconductor laser 24 as shown in FIG. 3, respectively. That is, the semiconductor laser 47 is a high-power Fabry-Perot semiconductor laser which emits output light having a wavelength of about 1400 nm as excitation light EL1. The coupler 46 combines the excitation light EL1 with the second WDM light L2 to inject it into the optical fiber OF12.

The WDM transceiver 50 includes a WDM transmitter section 51a composed of sixteen 10 Gb/s optical transmitters $TX_{17}$–$TX_{32}$, AWG wavelength multiplexer 52a, a wavelength band coupler 53a, AWG wavelength demultiplexer 54a, and a WDM receiver section 55a composed of sixteen WDM optical receivers $RX_1$–$RX_{16}$, which are the same as the WDM transmitter section 21, the AWG wavelength multiplexer 22, the wavelength band coupler 23, the AWG wavelength demultiplexer 26, and the WDM receiver section 27 as shown in FIG. 3, respectively.

In addition, the WDM transceiver 50 includes a coupler 56 and a semiconductor laser 57, which are the same as the coupler 25 and the semiconductor laser 24 as shown in FIG. 3, respectively. That is, the semiconductor laser 57 is a high-power Fabry-Perot semiconductor laser which emits output light having a wavelength of about 1400 nm as excitation light EL2. The coupler 56 combine the excitation light EL2 with the second WDM light L2 to inject it into the optical fiber OF11.

The WDM transceiver 50 further includes a WDM transmitter section 51b composed of sixteen 10 Gb/s optical transmitters $TX_1$–$TX_{16}$, AWG wavelength multiplexer 52b, a wavelength band coupler 53b, AWG wavelength demultiplexer 54b, and a WDM receiver section 55b composed of sixteen WDM optical receivers $RX_{17}$–$RX_{32}$, which are the same as the WDM transmitter section 11, the AWG wavelength multiplexer 12, the wavelength band coupler 13, the AWG wavelength demultiplexer 14, and the WDM receiver section 15 as shown in FIG. 3, respectively.

The WDM repeaters 30a and 30b each have the same structure as the WDM repeater 30 as shown in FIG. 4 except for input/output direction of the first and second WDM lights L1 and L2.

More specifically, in the WDM repeater 30a, the first WDM light L1 received from the AWG wavelength multiplexer 42a of the WDM transceiver 40 enters the wavelength band coupler 33 through the coupler 31 and is forwarded to the Thulium-doped fiber amplifier 34. The first WDM light L1 is amplified by the thulium-doped fiber amplifier 34. Thereafter the amplified first WDM light L1 is transmitted to the WDM transceiver 50 through the wavelength band coupler 36 and the optical fiber OF11. In the WDM transceiver 50, the first WDM light L1 is forwarded to the AWG wavelength demultiplexer 54a by the wavelength band coupler 53a. The first WDM light L1 is demultiplexed by the AWG wavelength demultiplexer 54a into corresponding wavelength lights, which are output to respective the optical receivers $RX_1$–$RX_{16}$.

On the other hand, the second WDM light L2 received from the WDM transceiver 50 enters the Erbium-doped fiber amplifier 35 through the wavelength band coupler 36. The second WDM light L2 is amplified by the Erbium-doped fiber amplifier 35. Thereafter the amplified second WDM light L2 is forwarded to the coupler 31 by the wavelength band coupler 33. The coupler 31 combines the amplified second WDM light L2 with excitation light EL3 emitted from the semiconductor laser 32. The excitation light EL3 has the approximately same wavelength as the excitation light EL2 emitted by the semiconductor laser 57 of the WDM transceiver 50. A combined light of the second WDM light L2 and the excitation light EL3 is transmitted to the WDM transceiver 40 through the optical fiber OF11. In the WDM transceiver 40, the second WDM light L2 is forwarded to the AWG wavelength demultiplexer 44a by the wavelength band coupler 43a. The second WDM light L2 is demultiplexed by the AWG wavelength demultiplexer 44a into corresponding wavelength lights, which are output to respective the optical receivers $RX_{17}$–$RX_{32}$.

In the WDM repeater 30b, the first WDM light L1 received from the AWG wavelength multiplexer 52a of the WDM transceiver 50 enters the wavelength band coupler 33 through the coupler 31 and is forwarded to the Thulium-doped fiber amplifier 34. The first WDM light L1 is amplified by the thulium-doped fiber amplifier 34. Thereafter the amplified first WDM light L1 is transmitted to the WDM transceiver 40 through the wavelength band coupler 36 and the optical fiber OF12. In the WDM transceiver 40, the first WDM light L1 is forwarded to the AWG wavelength demultiplexer 44b by the wavelength band coupler 43b. The first WDM light L1 is demultiplexed by the AWG wavelength demultiplexer 44b into corresponding wavelength lights, which are output to respective the optical receivers $RX_1$–$RX_{16}$ or the WDM receiver section 45b.

On the other hand, the second WDM light L2 received from the WDM transceiver 40 enters the Erbium-doped fiber amplifier 3b through the wavelength band coupler 36. The second WDM light L2 is amplified by the Erbium-doped fiber amplifier 35. Thereafter the amplified second WDM light L2 is forwarded to the coupler 31 by the wavelength band coupler 33. The coupler 31 combines the amplified second WDM light L2 with excitation light EL4 emitted from the semiconductor laser 32. The excitation light EL4 has the approximately same wavelength as the excitation light EL1 emitted by the semiconductor laser 47 of the WDM transceiver 40. A combined light of the second WDM light L2 and the excitation light EL4 is transmitted to the WDM transceiver 50 through the optical fiber OF12. In the WDM transceiver 50, the second WDM light L2 is forwarded to the AWG wavelength demultiplexer 54b by the wavelength band coupler 53b. The second WDM light L2 is demultiplexed by the AWG wavelength demultiplexer 54b into corresponding wavelength lights, which are output to respective the optical receivers $RX_{17}$–$RX_{32}$ of the WDM receiver section 55b.

According to the third embodiment as described above, long distance transmission having an increased number of channels can be achieved with suppressing nonlinear effect due to inter-band Raman amplification.

The WDM repeaters 30a and 30b may be omitted. In this case, the WDM transceivers 40 and 50 are connected to each other by the two optical fibers OF11 and OF12 without any repeaters.

Fourth Embodiment

Figure 6:
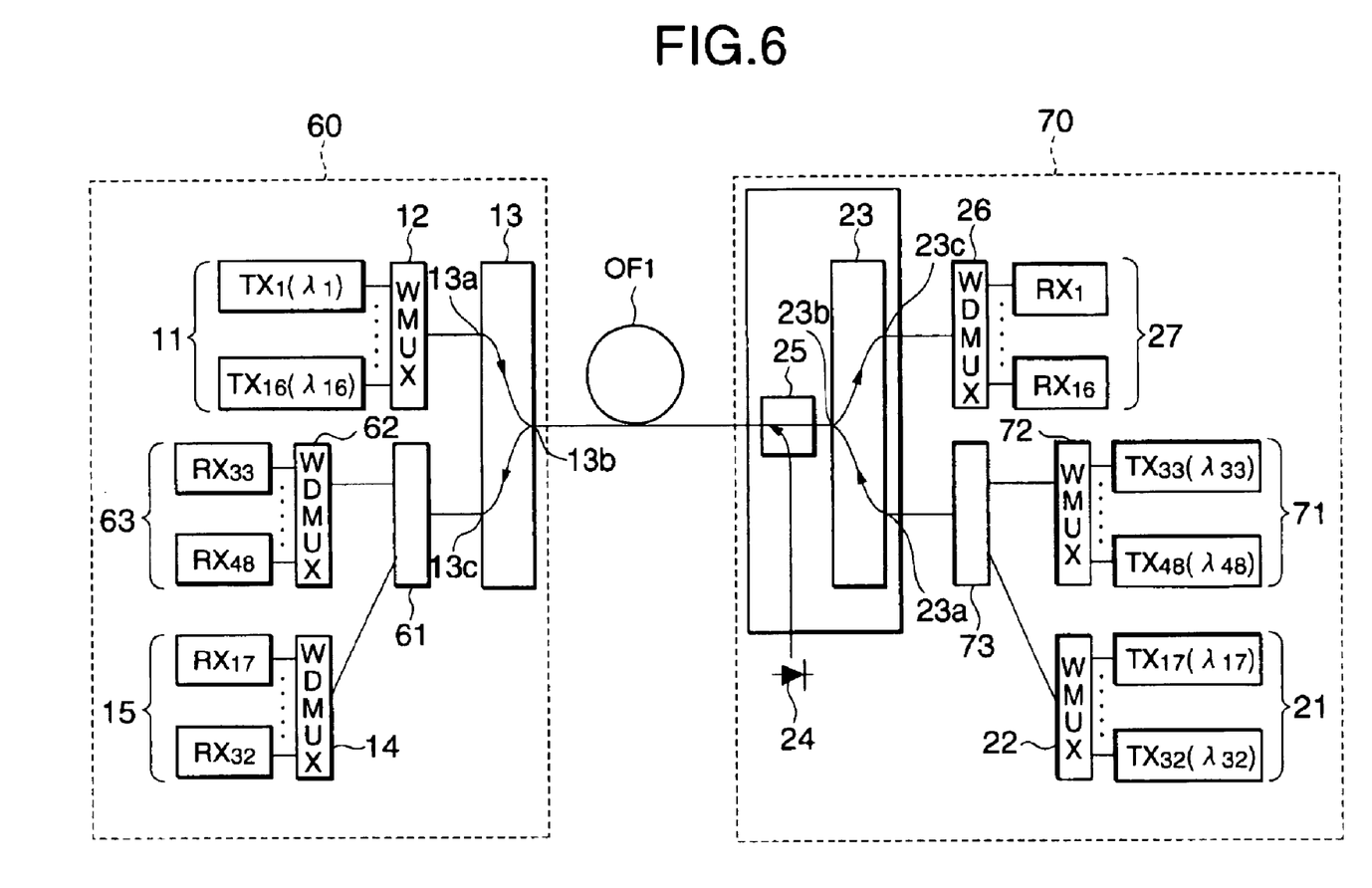
FIG. 6 is a diagram showing a WDM transceiver in a WDM transmission system according to a fourth embodiment of the present invention.

Referring to FIG. 6, an optical WDM transmission system according to a fourth embodiment of the present invention is composed of a WDM transceiver 60 and a WDM transceiver 70, which are connected by an optical fiber OF1 made of silica-base material. In FIG. 6, blocks similar to those previously described with reference to FIG. 3 are denoted by the same reference numerals and the details will be omitted.

In the above-described first to third embodiments, the first WDM light L1 of 1.49-µm band ranging from 1487.8 nm (201.5 tHz) to 1499.0 nm (200.0 THz) and the second WDM light L2 of 1.58-µm band ranging from 1586.2 nm (189.0 THz) to 1598.9 nm (187.5 THz) are used to perform WDM communication between end transceivers.

The WDM transmission system according to the fourth embodiment is designed to perform WDM communication between end transceivers, in addition to the 1.49-µm band and the 1.58-µm band, using third WDM light L3 having a 1.55-µm band located between the 1.49-µm band and the 1.58-µm band. In this embodiment, the first WDM light L1 travels from the WDM transceiver 60 to the WDM transceiver 70 and the second WDM light L2, the third WDM light L3 and the excitation light EL travel from the WDM transceiver 70 to the WDM transceiver 60.

As shown in FIG. 6, the WDM transceiver 60 includes the WDM transmitter section 11, the AWG wavelength multiplexer 12, the wavelength band coupler 13, the AWG wavelength demultiplexer 14, and the WDM receiver section 15, which are shown in FIG. 3, and further includes a wavelength splitting coupler 61, AWG wavelength demultiplexer 62, and WDM receiver section 63 composed of optical receivers $RX_{33}$–$RX_{48}$.

The port 13c of the wavelength band coupler 13 is connected to an input port of the wavelength splitting coupler 61, which splits received light into the second and third WDM lights L2 and L3. The second WDM light L2 is output to the AWG wavelength demultiplexer 14 and the third WDM light L3 is output to the AWG wavelength demultiplexer 62. The AWG wavelength demultiplexer 14 demultiplexes the second WDM light L2 into sixteen optical received signals of corresponding wavelengths, which are output to the respective WDM optical receivers $RX_{17}$–$RX_{32}$ of the WDM receiver section 15. Similarly, the AWG wavelength demultiplexer 62 demultiplexes the third WDM light L3 into sixteen optical received signals of corresponding wavelengths, which are output to the respective WDM optical receivers $RX_{33}$–$RX_{42}$ of the WDM receiver section 63.

The WDM transceiver 70 includes the WDM transmitter section 21, the AWG wavelength multiplexer 22, the wavelength band coupler 23, the semiconductor laser 24, the coupler 25, the AWG wavelength demultiplexer 26, and the WDM receiver section 27, which are shown in FIG. 3, and further includes a WDM transmitter section 71 composed of optical transmitters $TX_{33}$–$TX_{48}$, an AWG wavelength multiplexer 12, and a wavelength combining coupler 73. The optical transmitters $TX_{33}$–$TX_{48}$ of the WDM transmitter section 71 are set to different wavelength bands $\lambda_{39}$–$\lambda_{48}$ which are spaced every 100 GHz within a range from 1540.6 nm (194.6 THz) to 1552.5 nm (193.1 THz).

The AWG wavelength multiplexer 72 multiplexes lights transmitted by the respective optical transmitters $TX_{33}$–$TX_{48}$ into third WDM light L3, which is output to one input port of the wavelength combining coupler 73. The wavelength combining coupler 73 combines the second WDM light L2 from the AWG wavelength multiplexer 22 and the third WDM light L3 from the AWG wavelength multiplexer 72 to output it to the port 23a of the wavelength band coupler 23.

As described before, the second WDM light L2 and the third WDM Light L3 travel in the same direction as the excitation light EL within the optical fiber OF1. As described before, the wavelength band of the third WDM light L3 is located between those of the first WDM light L1 and the second WDM light L2. Therefore, the third WDM light L3 is not set to the optimal wavelength band for the inter-band Raman scattering. However, inter-band Raman amplification phenomenon occurs not only when a wavelength spacing between the excitation light EL and the third WDM light L3 is equal to 100 nm, but also when the wavelength spacing falls into some range around 100 nm. Accordingly, even when the wavelength band of the third WDM light L3 is set to a range out of 100 nm as in the fourth embodiment, long distance transmission can be achieved with suppressing nonlinear effect due to inter-band Raman amplification.

It is possible to provide another excitation light having a wavelength of about 1.45 μm which is shorter than the wavelength of the third WDM light L3 by 100 nm.

Further, the third WDM light L3 can be combined with the first WDM light L1 instead of the second WDM light L2.

The present invention is not limited to the above-described first to fourth embodiments. For example, in the fourth embodiment, the WDM repeater 30 as shown in FIG. 4 can be provided between the WDM transceivers 60 and 70. Further, the fourth embodiments can be expanded to a system using two optical fibers OF11 and OF12 as shown in FIG. 5, through each of which the first to third WDM lights L1, L2, and L3 travel. This can achieve WDM bidirectional transmission with a further increased number of channels and suppressing nonlinear effect due to inter-band Raman amplification.

In the above first to fourth embodiments, wavelength band couples 12, 23, 33, 36, 43a, 43b, 53a, and 53b may be WDM coupler of optical fibers OF1, OF11 and OF12 or WDM coupler using multilayer filter. Alternatively, an optical circulator may be employed in place of each of the wavelength band couplers 12, 23, 33, 36, 43a, 43b, 53a, and 53b.

The optical fiber OF1, OF11 or OF12 may be not only a single fiber but a combination of a plurality of fibers having different dispersions.

The light amplifying device is not limited to the Thulium-doped fiber amplifier 34 and Erbium-doped fiber amplifier 35. Another rare-earth doped amplifier, lumped Raman amplifier, semiconductor optical amplifier or the like may be employed.

Furthermore, a wavelength spacing between the first and second WDM lights, or the first and third WDM lights, is not limited to 100 nm. As described before, the wavelength spacing may be greater or smaller than 100 nm.

Needless to say, the number of multiplexed wavelengths is not limited to 16 and each spacing of the multiplexed wavelength bands is not limited to 100 GHz.

What is claimed is:

1. An optical wavelength-multiplexing transmission system for transmitting first wavelength-multiplexing light and second wavelength-multiplexing light in opposite directions through an optical transmission medium allowing bidirectional wavelength-multiplexing transmission, wherein a wavelength band of the first wavelength-multiplexing light is set to a shorter wavelength side as compared to a wavelength band of the second wavelength-multiplexing light, said first wavelength-multiplexing light and said second wavelength-multiplexing light being simultaneously transmitted through said optical transmission medium and causing increased attenuation of the energy of said first wavelength-multiplexing light and reduced attenuation of the energy of the second multiplexing light, and excitation light having a wavelength shorter than the wavelength band of the first wavelength-multiplexing light travels through the optical transmission medium in a same direction as the second wavelength-multiplexing light and in a direction opposite to said first wavelength-multiplexing light, whereby said increased attenuation of said energy of said first wavelength-multiplexing light is compensated along the optical transmission medium.

2. The optical wavelength-multiplexing transmission system according to claim 1, wherein a spacing between the wavelength of the excitation light and the wavelength band of the first wavelength-multiplexing light is determined depending on a Raman scattering characteristic of the optical transmission medium.

3. An optical wavelength-multiplexing transmission system for transmitting first wavelength-multiplexing light and second wavelength-multiplexing light in opposite directions through an optical transmission medium allowing bidirectional wavelength-multiplexing transmission, wherein a wavelength band of the first wavelength-multiplexing light is set to a shorter wavelength side as compared to a wavelength band of the second wavelength-multiplexing light, said first wavelength-multiplexing light and said second wavelength-multiplexing light being simultaneously transmitted through said optical transmission medium and causing increased attenuation of the energy of said first wavelength-multiplexing light and reduced attenuation of the energy of the second multiplexing light, and excitation light having a wavelength shorter than the wavelength band of the first wavelength-multiplexing light travels through the optical transmission medium in a same direction as the second wavelength-multiplexing light and in a direction opposite to said first wavelength-multiplexing light, whereby said increased attenuation of said energy of said first wavelength-multiplexing light is compensated along the optical transmission medium, wherein a wavelength bandwidth including the first wavelength-multiplexing light and the second wavelength-multiplexing light is at least 100 nm.

4. The optical wavelength-multiplexing transmission system according to claim 1, comprising:

a first transceiver provided at one end of the optical transmission medium, for injecting the first wavelength-multiplexing light into the optical transmission medium and receiving the second wavelength-multiplexing light from the optical transmission medium; and a second transceiver provided at the other end of the optical transmission medium, for injecting the second wavelength-multiplexing light into the optical transmission medium and receiving the first wavelength-multiplexing light from the optical transmission medium.

5. The optical wavelength-multiplexing transmission system according to claim 4, further comprising:

at least one wavelength-multiplexing repeater provided between the first transceiver and the second transceiver, comprising:

a first amplifier for amplifying the first wavelength-multiplexing light;

a second amplifier for amplifying the second wavelength-multiplexing light; and an excitation light injector for injecting second excitation light into the optical transmission medium in the same direction as the excitation light injected by the second transceiver, wherein the second excitation light has a wavelength which is approximately equal to the wavelength of the excitation light.

6. The optical wavelength-multiplexing transmission system according to claim 1, comprising:
a first end device provided at one end of each of a first optical transmission medium and a second optical transmission medium, comprising:
a first transceiver for injecting first wavelength-multiplexing light into the first optical transmission medium and receiving second wavelength-multiplexing light from the first optical transmission medium; and
a second transceiver for injecting the second wavelength-multiplexing light and first excitation light into the second optical transmission medium and receiving the first wavelength-multiplexing light from the second optical transmission medium; and
a second end device provided at the other end of each of the first optical transmission medium and the second optical transmission medium, comprising:
a third transceiver for injecting the second wavelength-multiplexing light and second excitation light to the first optical transmission medium and receiving the first wavelength-multiplexing light from the first optical transmission medium; and
a fourth transceiver for injecting the first wavelength-multiplexing light to the second optical transmission medium and receiving the first wavelength-multiplexing light from the second optical transmission medium.

7. The optical wavelength-multiplexing transmission system according to claim 6, further comprising:
a first wavelength-multiplexing repeater provided on a line of the first optical transmission medium, comprising:
a first amplifier for amplifying the first wavelength-multiplexing light;
a second amplifier for amplifying the second wavelength-multiplexing light;
a first excitation light injector for injecting third excitation light into the first optical transmission medium in the same direction as the second excitation light injected by the third transceiver, wherein the third excitation light has a wavelength which is approximately equal to the second excitation light; and
a second wavelength-multiplexing repeater provided on a line of the second optical transmission medium, comprising:
a third amplifier for amplifying the first wavelength-multiplexing light;
a fourth amplifier for amplifying the second wavelength-multiplexing light;
a second excitation light injector for injecting fourth excitation light into the second optical transmission medium in the same direction as the first excitation light injected by the second transceiver, wherein the fourth excitation light has a wavelength which is approximately equal to the first excitation light.

8. The optical wavelength-multiplexing transmission system according to claim 1, wherein third wavelength-multiplexing light travels through the optical transmission medium in a same direction as the second wavelength-multiplexing light, wherein a wavelength band of the third wavelength-multiplexing light is set to a longer wavelength side as compared to the wavelength band of the first wavelength-multiplexing light and a shorter wavelength side as compared to the wavelength band of the second wavelength-multiplexing light.

9. The optical wavelength-multiplexing transmission system according to claim 8, wherein second excitation light travels through the optical transmission medium in the same direction as the first wavelength-multiplexing light, wherein a wavelength of the second excitation light is set to be shorter than the wavelength band of the second wavelength-multiplexing light by a same amount as a wavelength spacing between the excitation light and the first wavelength-multiplexing light.

10. The optical wavelength-multiplexing transmission system according to claim 4, wherein
the second transceiver further injects third wavelength-multiplexing light to the optical transmission medium, wherein a wavelength band of the third wavelength-multiplexing light is set to a longer wavelength side as compared to the wavelength band of the first wavelength-multiplexing light and a shorter wavelength side as compared to the wavelength band of the second wavelength-multiplexing light, and
the first transceiver receives the third wavelength-multiplexing light from the second transceiver through the optical transmission medium.

11. The optical wavelength-multiplexing transmission system according to claim 5, wherein
the second transceiver further injects third wavelength-multiplexing light to the optical transmission medium, wherein a wavelength band of the third wavelength-multiplexing light is set to a longer wavelength side as compared to the wavelength band of the first wavelength-multiplexing light and a shorter wavelength side as compared to the wavelength band of the second wavelength-multiplexing light, and
the first transceiver receives the third wavelength-multiplexing light from the second transceiver through the optical transmission medium.

12. The optical wavelength-multiplexing transmission system according to claim 1, wherein
the first wavelength-multiplexing light is included in a wavelength range from 1480 nm to 1520 nm, and
the second wavelength-multiplexing light is included in a wavelength range from 1580 nm to 1620 nm.

13. The optical wavelength-multiplexing transmission system according to claim 8, wherein
the first wavelength-multiplexing light is included in a wavelength range from 1480 nm to 1520 nm,
the second wavelength-multiplexing light is included in a wavelength range from 1580 nm to 1620 nm, and
the third wavelength-multiplexing light is included in a wavelength range from 1530 nm to 1560 nm.

14. The optical wavelength-multiplexing transmission system according to claim 10, wherein
the first wavelength-multiplexing light is included in a wavelength range from 1480 nm to 1520 nm,
the second wavelength-multiplexing light is included in a wavelength range from 1580 nm to 1620 nm, and the third wavelength-multiplexing light is included in a wavelength range from 1530 nm to 1560 nm.

15. The optical wavelength-multiplexing transmission system according to claim 11, wherein
the first wavelength-multiplexing light is included in a wavelength range from 1480 nm to 1520 nm,
the second wavelength-multiplexing light is included in a wavelength range from 1580 nm to 1620 nm, and
the third wavelength-multiplexing light is included in a wavelength range from 1530 nm to 1560 nm.

16. An optical wavelength-multiplexing transceiver comprising:
a receiver for receiving first wavelength-multiplexing light from an optical transmission medium; and
a transmitter for injecting second wavelength-multiplexing light and excitation light to the optical transmission medium in a direction opposite to said first wavelength-multiplexing light simultaneously with said receiver receiving said first wavelength-multiplexing light from said optical transmission medium,
wherein a wavelength band of the second wavelength-multiplexing light is set to a longer wavelength side as compared to a wavelength band of the first wavelength-multiplexing light, and the excitation light has a wavelength shorter than the wavelength band of the first wavelength-multiplexing light whereby energy of said first wavelength-multiplexing light is compensated for energy transfer from said first wavelength-multiplexing light to said second wavelength-multiplexing light along the optical transmission medium.

17. The optical wavelength-multiplexing transceiver according to claim 16, wherein a spacing between the wavelength of the excitation light and the wavelength band of the first wavelength-multiplexing light is determined depending on a Raman scattering characteristic of the optical transmission medium.

18. An optical wavelength-multiplexing transceiver comprising:
a receiver for receiving first wavelength-multiplexing light from an optical transmission medium; and
a transmitter for injecting second wavelength-multiplexing light and excitation light to the optical transmission medium in a direction opposite to said first wavelength-multiplexing light simultaneously with said receiver receiving said first wavelength-multiplexing light from said optical transmission medium,
wherein a wavelength band of the second wavelength-multiplexing light is set to a longer wavelength side as compared to a wavelength band of the first wavelength-multiplexing light, and the excitation light has a wavelength shorter than the wavelength band of the first wavelength-multiplexing light whereby energy of said first wavelength-multiplexing light is compensated for energy transfer from said first wavelength-multiplexing light to said second wavelength-multiplexing light along the optical transmission medium, wherein a wavelength bandwidth including the first wavelength-multiplexing light and the second wavelength-multiplexing light is at least 100 nm.

19. A wavelength-multiplexing repeater for use in a wavelength-multiplexing transmission system for transmitting first wavelength-multiplexing light and second wavelength-multiplexing light in opposite directions simultaneously through an optical transmission medium allowing bidirectional wavelength-multiplexing transmission through the optical transmission medium, comprising:
a first amplifier for amplifying the first wavelength-multiplexing light;
a second amplifier for amplifying the second wavelength-multiplexing light and injecting the amplified second wavelength-multiplexing light into the optical transmission medium;
an excitation light injector for injecting excitation light into the optical transmission medium in the same direction as the second wavelength-multiplexing light and in a direction opposite to said first wavelength-multiplexing light,
wherein a wavelength band of the second wavelength-multiplexing light is set to a longer wavelength side as compared to a wavelength band of the first wavelength-multiplexing light, and the excitation light has a wavelength shorter than the wavelength band of the first wavelength-multiplexing light, whereby energy of the first wavelength-multiplexing light is compensated for energy transfer from said first wavelength-multiplexing light to said second wavelength-multiplexing light along the optical transmission medium.

20. The wavelength-multiplexing repeater according to claim 19, wherein a spacing between the wavelength of the excitation light and the wavelength band of the first wavelength-multiplexing light is determined depending on a Raman scattering characteristic of the optical transmission medium.

21. A wavelength-multiplexing repeater for use in a wavelength-multiplexing transmission system for transmitting first wavelength-multiplexing light and second wavelength-multiplexing light in opposite directions simultaneously through an optical transmission medium allowing bidirectional wavelength-multiplexing transmission through the optical transmission medium, comprising:
a first amplifier for amplifying the first wavelength-multiplexing light;
a second amplifier for amplifying the second wavelength-multiplexing light and injecting the amplified second wavelength-multiplexing light into the optical transmission medium;
an excitation light injector for injecting excitation light into the optical transmission medium in the same direction as the second wavelength-multiplexing light and in a direction opposite to said first wavelength-multiplexing light,
wherein a wavelength band of the second wavelength-multiplexing light is set to a longer wavelength side as compared to a wavelength band of the first wavelength-multiplexing light, and the excitation light has a wavelength shorter than the wavelength band of the first wavelength-multiplexing light, whereby energy of the first wavelength-multiplexing light is compensated for energy transfer from said first wavelength-multiplexing light to said second wavelength-multiplexing light along the optical transmission medium, wherein a wavelength bandwidth including the first wavelength-multiplexing light and the second wavelength-multiplexing light is at least 100 nm.

22. An optical wavelength-multiplexing method comprising the steps of:
propagating first light of a first wavelength in one direction through an optical transmission medium;
propagating second light of a second wavelength in an opposite direction to the one direction through the optical transmission medium simultaneously with said propagating of the light of the first wavelength through the optical transmission medium, wherein the first wavelength is shorter than the second wavelength; and propagating first excitation light of a first excitation light wavelength in the opposite direction to said light of said first wavelength through the optical transmission medium and in a same direction to said light of said second wavelength, wherein the first excitation light wavelength is shorter than the first wavelength whereby energy of the light of the first wavelength is compensated for energy transfer from said first wavelength-multiplexing light to said second wavelength-multiplexing light along the optical transmission medium.

23. The optical wavelength-multiplexing method according to claim 22, wherein a spacing between the first excitation light wavelength and the first wavelength is determined depending on a Raman scattering characteristic of the optical transmission medium.

24. An optical wavelength-multiplexing method comprising the steps of:

propagating first light of a first wavelength in one direction through an optical transmission medium;

propagating second light of a second wavelength in an opposite direction to the one direction through the optical transmission medium simultaneously with said propagating of the light of the first wavelength through the optical transmission medium, wherein the first wavelength is shorter than the second wavelength; and propagating first excitation light of a first excitation light wavelength in the opposite direction to said light of said first wavelength through the optical transmission medium and in a same direction as said light of said second wavelength, wherein the first excitation light wavelength is shorter than the first wavelength whereby energy of the light of the first wavelength is compensated for energy transfer from said first wavelength-multiplexing light to said second wavelength-multiplexing light along the optical transmission medium, wherein a wavelength bandwidth including the first light and the second light is at least 100 nm.

25. The optical wavelength-multiplexing method according to claim 22, further comprising the step of:

propagating third light of a third wavelength in the opposite direction through the optical transmission medium, wherein the third wavelength is longer than the first wavelength and shorter than the second wavelength.

26. The optical wavelength-multiplexing method according to claim 25, further comprising the step of:

propagating second excitation light of a second excitation light wavelength in an opposite direction to the third light through the optical transmission medium, wherein the second excitation light wavelength is shorter than the third wavelength by the approximately same amount as a wavelength spacing between the first excitation light and the first wavelength.

* * * * *